United States Patent
Halpern

(10) Patent No.: US 7,652,695 B2
(45) Date of Patent: Jan. 26, 2010

(54) SYSTEM AND A METHOD FOR IMPROVING THE CAPTURED IMAGES OF DIGITAL STILL CAMERAS

(76) Inventor: Oren Halpern, 43a Hashmonaim Street, Kiriat Mozkin (IL) 26337

( * ) Notice: Subject to any disclaimer, the term of this patent is extended or adjusted under 35 U.S.C. 154(b) by 0 days.

(21) Appl. No.: 11/697,867

(22) Filed: Apr. 9, 2007

(65) Prior Publication Data

US 2007/0195174 A1    Aug. 23, 2007

Related U.S. Application Data

(63) Continuation-in-part of application No. PCT/IL2005/001072, filed on Oct. 10, 2005.

(60) Provisional application No. 60/618,580, filed on Oct. 15, 2004.

(51) Int. Cl.
   *H04N 5/262* (2006.01)
   *H04N 5/235* (2006.01)
   *H04N 5/225* (2006.01)
   *H04N 5/228* (2006.01)

(52) U.S. Cl. .................... 348/239; 348/222.1; 348/169; 348/208.4; 382/117

(58) Field of Classification Search ............. 348/222.1, 348/362, 296, 231.3, 231.99, 363, 371, 239, 348/208.12–208.14, 208.4, 154–155, 169–172, 348/699–702; 382/117, 118, 173; 396/51, 396/122

See application file for complete search history.

(56) References Cited

U.S. PATENT DOCUMENTS

| | | | | |
|---|---|---|---|---|
| 4,975,969 A | * | 12/1990 | Tal | 382/116 |
| 5,689,575 A | * | 11/1997 | Sako et al. | 382/118 |
| 5,715,325 A | * | 2/1998 | Bang et al. | 382/118 |
| 5,850,470 A | * | 12/1998 | Kung et al. | 382/157 |
| 6,181,805 B1 | * | 1/2001 | Koike et al. | 382/118 |
| 6,188,777 B1 | * | 2/2001 | Darrell et al. | 382/103 |
| 6,633,655 B1 | * | 10/2003 | Hong et al. | 382/118 |
| 6,792,135 B1 | * | 9/2004 | Toyama | 382/118 |
| 6,907,136 B1 | * | 6/2005 | Shigemori | 382/118 |

(Continued)

OTHER PUBLICATIONS

Office Action from Canadian Intellectual Property Office dated Feb. 12, 2007.

(Continued)

*Primary Examiner*—Tuan Ho
*Assistant Examiner*—Marly Camargo
(74) *Attorney, Agent, or Firm*—The Law Office of Michael E. Kondoudis

(57) ABSTRACT

The present invention is a system and method which enable users achieve optimal results according to their preferences in digital still pictures. The preferred embodiments of the present invention, which may be installed on any apparatus which captures digital still images, such as digital cameras, cellular phones, PDA, allow users to achieve the still picture according to criteria they determined in advance. Users may define the attributes of the still picture they wish to have in the final photograph and the camera automatically determines the optimal timing to capture the image as users press the shutter button half way down. In addition, the camera may also correct the captured image according to predefined criteria. The system may therefore automatically avoid common flaws regarding the timing of the captured image and solve some of the image deformations caused by the use of the flash such as red-eye and reflections.

29 Claims, 9 Drawing Sheets

U.S. PATENT DOCUMENTS

| | | | |
|---|---|---|---|
| 6,940,545 B1 * | 9/2005 | Ray et al. | 348/222.1 |
| 6,944,317 B2 * | 9/2005 | Pavlovic et al. | 382/107 |
| 7,084,918 B2 * | 8/2006 | Robins et al. | 348/333.03 |
| 7,127,108 B2 * | 10/2006 | Kinjo et al. | 382/203 |
| 7,362,368 B2 * | 4/2008 | Steinberg et al. | 348/349 |
| 7,376,347 B2 * | 5/2008 | Sugimoto | 396/60 |
| 2003/0068084 A1 | 4/2003 | Kinjo | |
| 2003/0174869 A1 * | 9/2003 | Suarez | 382/118 |
| 2008/0316328 A1 * | 12/2008 | Steinberg et al. | 348/222.1 |

OTHER PUBLICATIONS

International Search Report for PCT/IL05/01072 filed Oct. 10, 2005 (to which this application claims priority).

Written Opinion mailed Jun. 30, 2008 for PCT/IL05/01072 filed Oct. 10, 2005 (to which this application claims priority).

Canon PowerShot SD100/Digital IXUS Camera User Guide (2003), pp. 50, 82-90, published on www.canon.ca/english-index-customersupport.asp?pid=236, canada (cited in C1).

* cited by examiner

SYSTEM AND A METHOD FOR IMPROVING THE CAPTURED IMAGES OF DIGITAL STILL CAMERAS

FIELD OF THE INVENTION

The present invention relates in general to the field of digital still photography, more particularly it relates to the field of systems and methods which enable reaching better results in digital still photography.

BACKGROUND

Digital still cameras enable users to achieve more satisfactory pictures in comparison to film still cameras, since users may see their captured images in near real-time, take multiple pictures without exhausting their resources and easily manipulate the final image using highly available image editing software applications.

Current day solutions offer users tools for improving the final image of digital pictures using image editing solutions. However, these solutions have several drawbacks. The first is that most of these solutions are software applications which run on desktop computers and users are only able to perform the corrections after the images are downloaded to the computer. Additionally, these software applications, which offer users semiautomatic image correction tools, usually allow users to perform minor changes in the image since they do not have any additional visual data at their disposal.

Performing significant changes in the final image require substantial image editing skills and demand investing a lot of time in every picture to produce satisfactory results. Thus, in the current state of the art technology particular situations still hinder users from achieving the picture they wish to capture. For instance, trying to take a picture of a young child when she is looking directly at the camera and smiling might prove to be a frustrating task, as the photographer, busy persuading the child to look at the camera and smile, might miss the only instance in which she is doing so. As many parents know, even repeated attempts might yield unsatisfactory results. Similarly, a user taking a picture of a group of people, who wants to make sure that each and every person is in full view, is with their eyes open and looking at the camera may find that paying attention to many different details at the same time is a difficult task, especially if the group is in a dynamic 'real-life' situation and not posing especially for the picture. Additionally, if a flash is used when a picture is taken, it may cause significant color distortions and loss of details in particular areas of the picture, such as the red-eye effect and when objects in the picture reflect the bright light of the flash.

It may be concluded that there are two types of problems which users of still cameras face for which current day technology lacks adequate solutions: problems caused by the timing of the captured image and flash induced problems. There is therefore a need for a simple to operate solution for these problems which may be implemented in digital still camera devices. This solution should address both the timing and the flash induced problems in a semiautomatic fashion and should be implemented on any type of device that includes a camera. Since typically these devices have more memory than processing resources at their disposal, the proposed solution should rely on gathering visual data in real-time rather then on performing elaborate image analyzing procedures.

SUMMARY OF SOME EMBODIMENTS OF THE INVENTION

The present invention provides a system for improving the capturing process of digital images which is associated with apparatus for capturing images. The system is comprised of: an interface module enabling a user to define the desired attributes of the subject and the scene dynamics of the captured image, an image tracking module for a continuous monitoring and calculating of all defined attribute values as defined by the user and a capturing module for an automatic activation of the capturing apparatus in accordance with defined user attributes.

According to further embodiment of the present invention the system further includes: a recording module for saving visual data prior to the capturing process, wherein the visual data definitions are based on user defined attributes and a correction module for manipulating captured images according to user preferences based on recorded visual data. The visual data include segments of the captured images which are captured at different timing, optionally taken a brief moment before the flash is activated. The image and all visual data are saved as a single logical entity for use at a later date, on any computerized device. The correction module according to the present invention enables the correction of flash induced problems including reflections and red-eyes, correction of the state of the eyes, looking direction and facial expression. The correction module image processing includes color changes, brightness adjustment and image orientation. The image capturing apparatus is a still digital camera or a video camera. The still digital camera can be housed in one of the following devices: a cellular phone, a PDA device, a personal computer. According to the present invention the attributes of the subjects features in the captured image include facial expressions, state of eyes, head orientation angles, looking direction angles and facial occlusion percentages and the attributes of the captured image scene dynamics include image motion speed and motion speed of the subjects.

According to further improvement of the present invention the interface module further enables setting the captured image attributes relative weight for the calculation of the total image grade. The particular percentage of the maximum total image grade is determined as a threshold indicator according to a default value. The threshold indicator presents the minimum match grade needed for the total image grade to exceed in order to activate the image capturing mechanism. The user interface may enable the user to change the value of the threshold indicator. The position of the threshold indicator can alternatively change automatically according to predetermined criteria. Optionally the automatic activation of the capturing apparatus is operated when the value of the total image grade exceeds the threshold value.

The present invention provides a method for improving the capturing process of digital images associated with an apparatus for capturing images. The method include the following steps: defining user preferences attributes of the captured image subject features and the captured image scene dynamics, continuously monitoring and calculating all attribute values as defined by the user, automatically activating the capturing apparatus in accordance with defined user attributes. According to a further embodiment, the method further comprises the steps of: saving visual data prior to the capturing process, wherein the visual data definitions are based on user attributes, and manipulating captured images according to user preferences based on recorded visual data.

BRIEF DESCRIPTION OF THE DRAWINGS

These and further features and advantages of the invention will become more clearly understood in the light of the ensuing description of an embodiment thereof, given by way of example, with reference to the accompanying figures, wherein.

DETAILED DESCRIPTION OF SOME EMBODIMENTS OF THE INVENTION

The present invention is a new and innovative system and method which enable users achieve optimal results according to their preferences and likings in digital still pictures. In some embodiments of the invention, the system and method may be installed on any apparatus which captures digital still images, such as digital cameras, cellular phones, personal digital assistants (PDA) and so on, allow users to achieve the still picture according to criteria they determined in advance. Users may define the attributes of the still picture they wish to have in the final photograph and the camera automatically determines the optimal timing to capture the image as users press the shutter button half way down. In addition, the camera may also correct the captured image according to pre-defined criteria. The system may therefore automatically avoid common flaws regarding the timing of the captured image and solve some of the image deformations caused by the use of the flash such as red-eye and reflections.

The attributes of the still picture may be described as belonging to one of two categories: image subject features and scene dynamics. The first category may include attributes concerning the facial features of the subjects appearing in the scene such as facial expressions, state of eyes (open or closed), head orientation angle, looking direction angle, facial occlusion percentage etc. In the second category includes attributes such as image motion speed and object motion speed.

Figure 1:
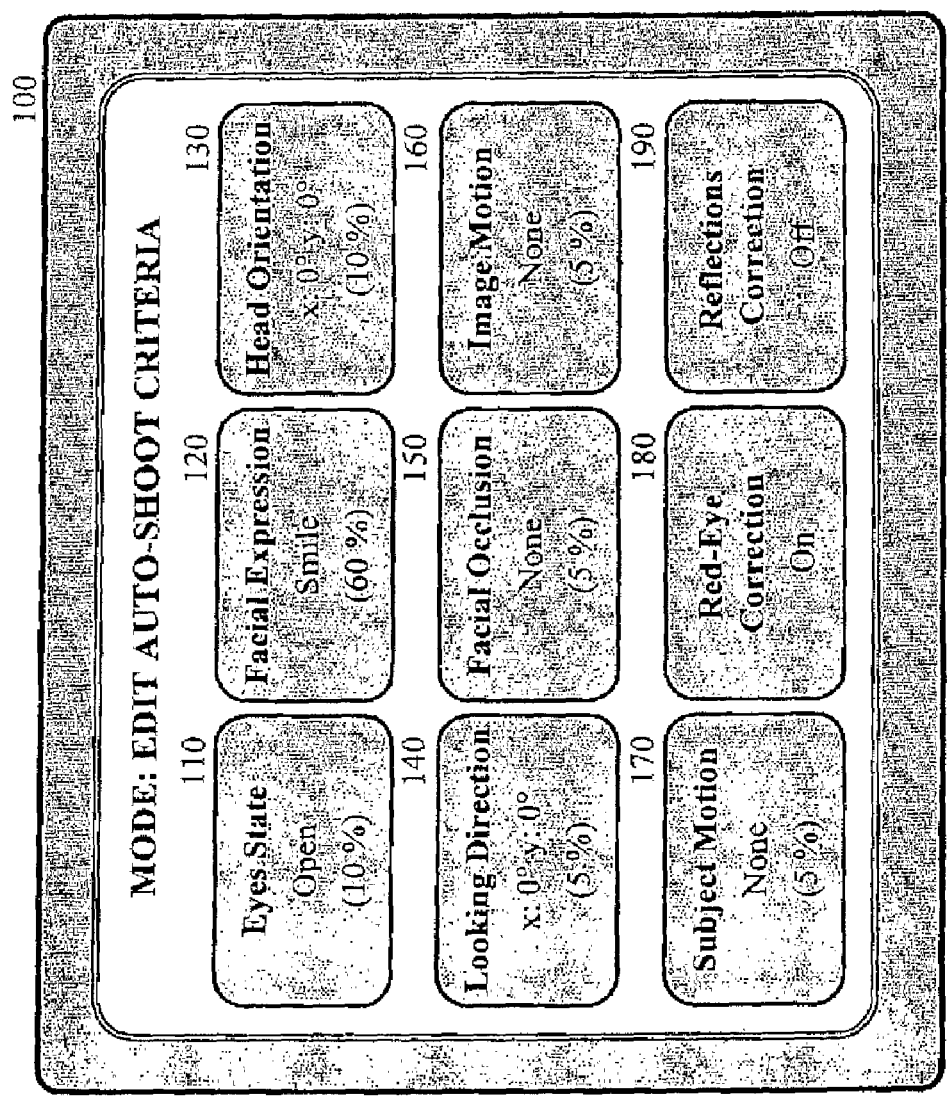
FIG. 1 is schematic illustration of a screenshot of the image preference menu according to an embodiment of the present invention.

In order to operate the solutions offered by the present invention the user needs to specify the criteria of the desired captured image before taking the picture. FIG. 1 is an illustration of a screenshot of the image preference menu, the Edit Auto-Shoot Criteria Mode screen. In this example seven image attributes are presented: Eye State 100, Facial Expression 120, Head Orientation 130, Looking Direction 140, Facial Occlusion 150, Image Motion 160 and Object Motion 170. Each of these attributes is given a default value. The Eye State 110 may be defined as "open" by default, but may be changed to "closed" by the user. The Facial Expression 120 may have "smiling" as a default value but may be changed by the user to "neutral", "crying", "surprised" or "extraordinary" (when the photographed person is 'making a face'). Head Orientation 130 is defined as the degrees of rotation of the head in relation to the perpendicular of the shutter-plane whereas at the x axis 0° the head of the photographed person facing the camera, at 90° the head of the person is turned to the right, at 180° the camera captures the back of the head of the person and at −90° the head of the person is turned to the left. The default value of this attribute is 0°, but it may be changed by the user to any value between −180° and 180°. Similarly, at the y axis at 0° the head of the person is facing the camera, between 0° and 90° the head of the person is tilted up and between 0° and −90° the head of the person is tilted down. The Looking Direction 140 defines the angle of the eyes in relation to the camera and is also measured by the number of degrees, on the same axes as the Head Orientation 130.

The Facial Occlusion 150 attribute allows the user to ensure that the full face of the photographed person is visible. The default value of this attribute is "none" but the user may also choose "partial xx %" or "all", whereas the xx % denotes the maximal percentage of the face which may be hidden from the camera. The Image Motion 160 and the Object Motion 170 allow the user to define whether the picture is taken when the camera or the photographed object are moving, accordingly. For both attributes the default value is "none"; the alternative value which may be given to these attributes is "some" followed by a number indicating movements in pixels per second.

In addition to setting the desired value of each attribute, the user may change their relative weight in the final calculation. Each attribute is given a percentage whereas the total sum of the percentages of all the attributes is equal to 100%. The higher the relative weight of a particular attribute is, greater are the chances it would appear in the final image. Thus, if in the illustrated example the Facial Expression 120 attribute is given 60%, the Eye State 110 and Head Orientation 130 are given 10% and all the rest are given 5%, the photographed person would most likely be captured when he or she is smiling. There is also a good chance that their eyes would be open and their head facing the camera. There is a smaller chance that the rest of the attributes are fulfilled. Even if they are fulfilled, their fulfillment is not a prerequisite for the automatic procedure of capturing the picture. The attributes specified above are given here as a way of example and in no way exhaust the possible attributes which may be given to the users according to the present invention. For example, additional attributes may include image perspective, image lighting and so on.

In addition to the above mentioned attributes the user may also be able to specify whether an automatic correction is needed for flash induced deficiencies: Red-Eyes Correction 180 and Reflections Correction 190. These two attributes can only receive an "on" or "off" value. Unlike attributes 110-170, attributes 180 and 190 do not define the conditions in which the picture is taken, but define the types of corrections which the camera may perform after the picture is captured.

Users may adjust the values of each attribute according to their liking and save these picture profiles in the memory of the camera for future use. In addition, users may be given preprogrammed profile templates which are suited for particular types of images. Users may also configure and change the preprogrammed templates.

Figure 2:
FIG. 2 is schematic illustration of the environment in which the camera may operate according to an embodiment of the present invention.
Figure 3:
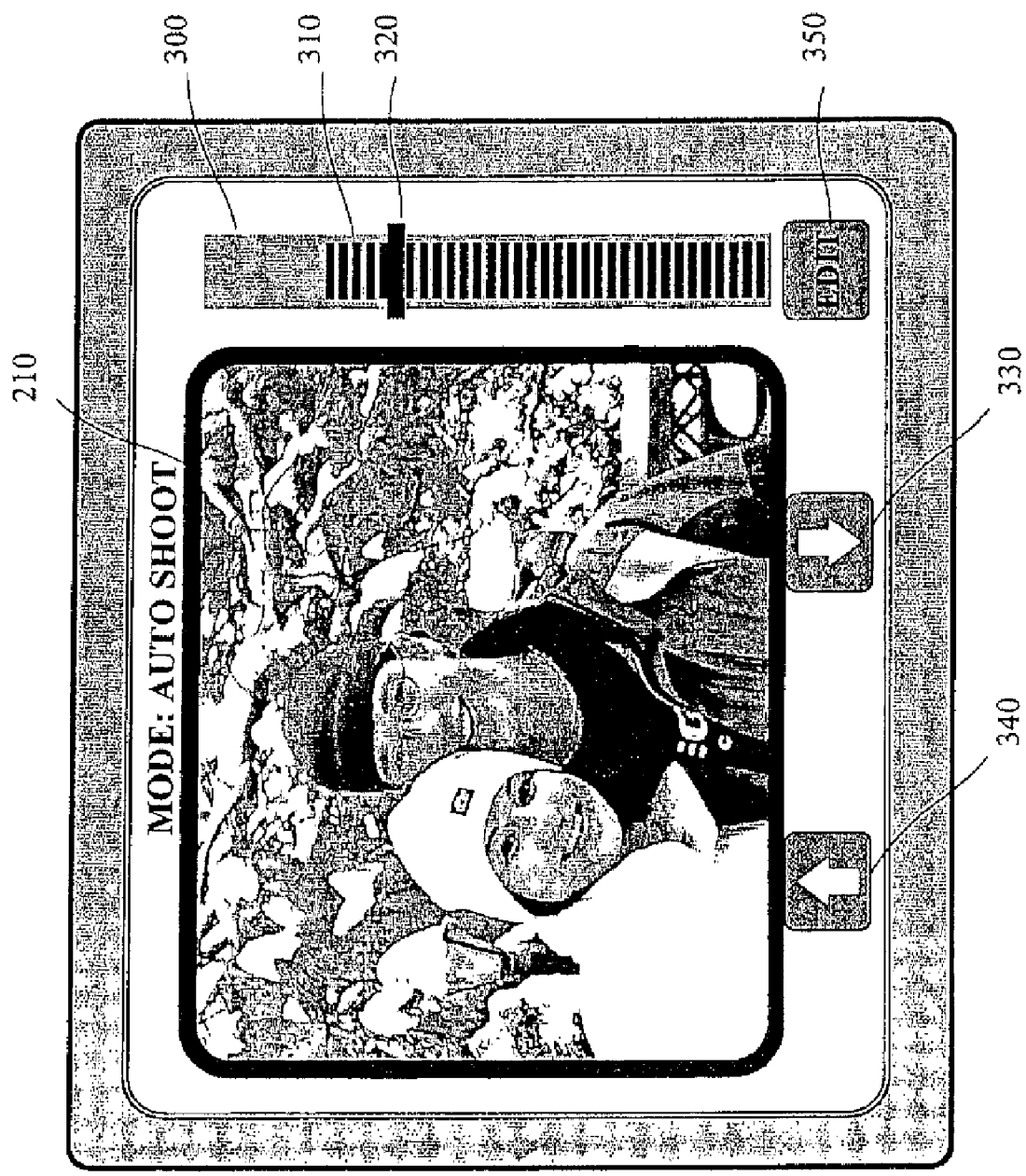
FIG. 3 is schematic illustration of a screenshot of the image capturing screen according to an embodiment of the present invention.

Reference is now made to FIG. 2. After choosing the attributes of the picture, the user aims the camera 200 at the subject of the photograph 210 and activates an automatic timing mechanism by pressing the shutter release button half way down. The image of the subject 210 appears on monitor 230 of camera 200. FIG. 3 is an illustration of the user interface on monitor 230 of camera 200. In addition to the image of the photographed subject 210, monitor 230 also displays a scale 300 with bars 310 and a threshold indicator 320. Bars 310 are continuously calculated according to the total image grade, which is the correlation of the image in monitor 230 at every given moment in relation to the specifications of the user. Thus, if the user indicated the weight of the facial expression of the subject as an important attribute, the number of bars 310 increases when the subjects 210 is smiling and decreases when they do not smile.

The system continuously calculates the total image grade of the image characteristics in correlation to the attributes defined by the user. Threshold indicator 320 represents the position of the general requirements threshold of the captured image according to the attributes as they are defined by the user preferences. Threshold indicator 320 is determined according to a default value as a particular percentage of the maximum total image grade. When the bars 310 exceed the level marked by the threshold indicator 320, a sufficient amount of user-defined criteria are met and the picture may be taken. By continuously pressing the shutter release button half-way down the user enables the automatic timing mechanism to decide when the exact time for activating the image capturing mechanism is.

Alternatively the user can override the automatic timing mechanism, and activate the image capturing mechanism manually, simply by pressing the shutter release button 220 all the way down. It is important to note that the user can override the automatic timing mechanism and activate the image capturing mechanism manually at any point in time, even if bars 310 don't exceed the level marked by the threshold indicator 320.

According to some embodiments, the user may define one of three automatic time-related image-capturing rules, that determine the exact time at which the automatic timing mechanism should activate the image capturing mechanism: taking the picture when a sufficient amount of criteria are met, taking the picture when a sufficient amount of criteria are met and are maintained for a predetermined time span or taking the picture when a sufficient amount of criteria are met and are at a maximum match between the image and the user-defined attributes.

According to the first rule the picture is automatically taken when the total image grade, indicated by the bars indicator 310, exceeds the minimum match grade defined by the user which is indicated by the threshold indicator 320.

According to the second rule the picture is automatically taken when the match grade exceeds the minimum match grade defined by the user and this level is maintained for the predetermined time period (e.g. 2 seconds). When this rule is activated, a small indicator marks the amount of time remaining before the picture is automatically taken.

According to the third rule the picture is automatically taken when the match grade exceeds the minimum match grade defined by the user, and is at its maximum value, whereas the maximum value may be defined as 100% of suitability between the image and the predefined attributes, or according to dynamic calculation of peak algorithms which are known to people who are skilled in the art.

In addition to the automatic time-related image-capturing rules, the system may also be programmed to take the picture when a specific single criterion is met. For instance, instead of operating the delay timer to take one's own picture, the user may program the system to take the picture when the captured image includes a particular number of faces. In this case the user can adjust the camera and then enter the field of view of the captured image before the picture is taken.

Alternatively, the single criterion may be defined as a single event in the captured image. For instance, wanting to take a picture of a couple kissing the user may define the kiss as the trigger event. In these modes the automatic capturing procedure does not operate on an accumulative algorithm, but according to a binary one: the system continuously analyzes the image, searching only for the particular event and when the event is identified the picture is taken.

If the user notices that the threshold indicator 320 is set too high and the bars 310 do not reach it, the user may lower the position of the threshold indicator 320 by using the down arrow 330. Similarly, the user may use the up arrow 340 to raise the level of the threshold indicator 320. Alternatively, the user may use the Edit button 350 to return to the Edit Auto-Shoot Criteria Mode screen 100 to change specific attributes and their relative weights. If the threshold indicator 320 is set too high and the bars 310 do not reach it after a predetermined time, the threshold may be lowered automatically by the system, according to a user predefined rule.

In addition to constantly analyzing the image, during this stage the system gathers information relating to the image for future use. For instance, the system collects analyzed data about the faces of the subjects and stores particular features, such as the eyes in an open state or the mouth when smiling. Provided that there is more than one person in the image, the system associates the gathered information to each subject individually, so it may later be associated with the correct person in the final image. If the flash of the camera is about to be activated, the system captures a pre-flash image, i.e. an image which is taken a fragment of a second before the flash is activated and the final image is captured. Based on the pre-flash image the system may correct flash induced image deformations in the final image.

After the picture was taken the user may activate the automatic image correction mechanism. According to some embodiments of the present invention, some image characteristics may be corrected after the image was taken according to visual data collected by the system. For instance, the system stores an image of the eyes of the subject in a fully open state before the final picture is taken. Then, if at the captured image the subject of the picture has his or her eyes closed, the system can paste the image of the open eyes over the closed eyes, while making the right adjustments in the looking direction, head orientation, scaling and so on. Similarly the system may correct flash induced problems such as reflections and red-eyes. In order to correct the red-eye effect, the system changes the color of the eyes in the final still image to the correct color according to continuous analysis of the faces of the subjects in the image and based on information about the eyes of the subjects from the pre-flash images. It is important to note that in addition to correcting the red-eye effect in human eyes the system may also perform the red-eye correction to non-human subjects, such as animals. To eliminate reflections of the flash in the final image the system can automatically identify areas that are much brighter than the rest of the image, and have a significant loss of details relative to the pre-flash still image, taken a brief moment before the flash was activated. The system can then match them with the same areas from the pre-flash still image, and then copy those areas from the pre-flash still image, paste them onto the problematic areas in the still image while applying radiometric corrections to them, making their coloring adequate to the final still image.

Figure 4:
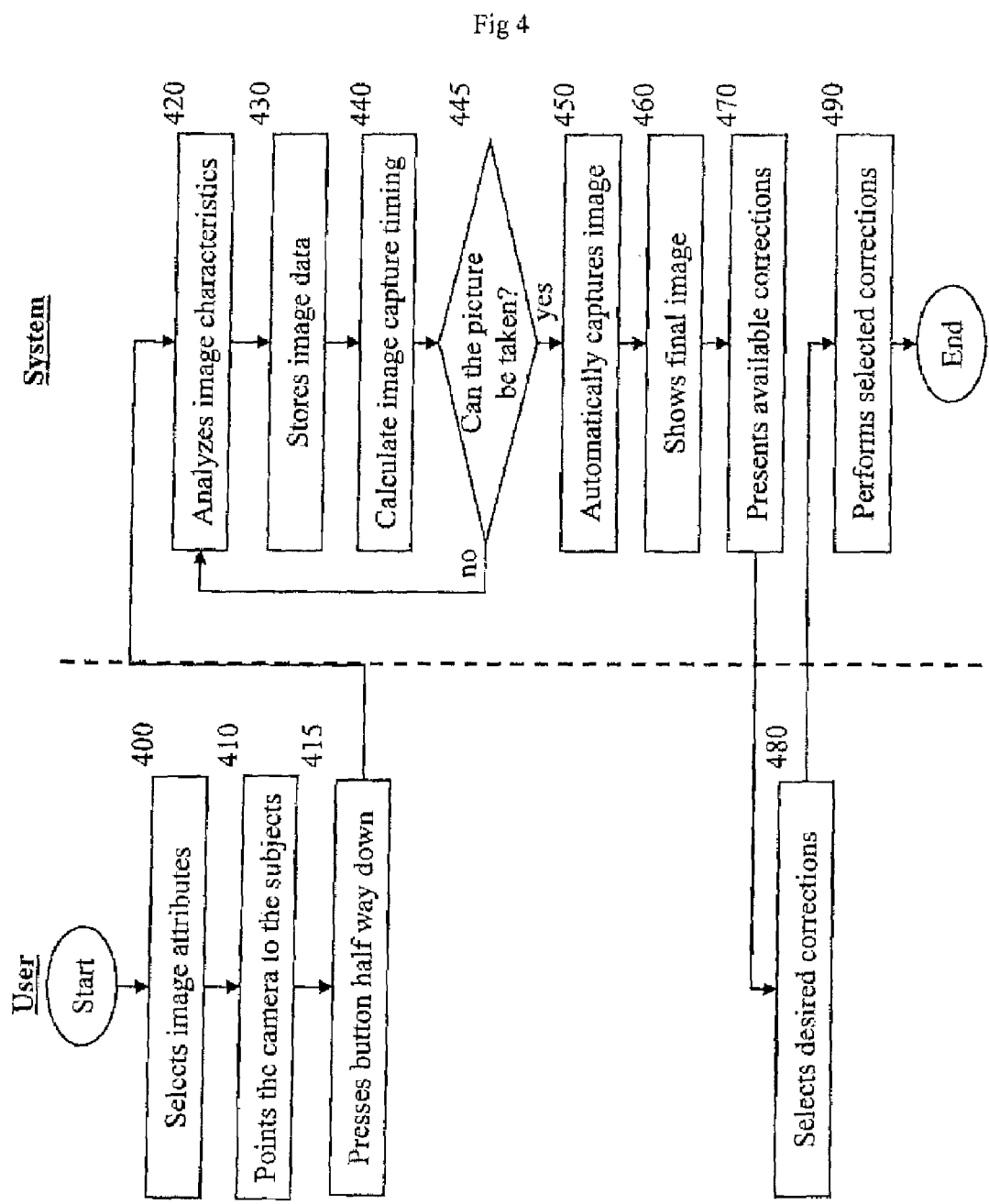
FIG. 4 is a flowchart illustrating the image capturing procedure using the automatic timing function according to an embodiment of the present invention.

Reference is now made to FIG. 4. The flowchart illustrates which operations in the sequence of operations are performed by the user, and which by the system. As mentioned above, it is the user who activates the camera and selects the image attributes 400. The user then needs to point the camera at the image subjects 410, and activate the automatic timing mechanism by pressing the shutter release button half-way down 415. The system then continuously analyzes the image characteristics 420, collects image data for future use 430 and calculates the appropriate time for capturing the picture 440. At step 445 the system decides whether or not the picture can be taken at that point in time. If the picture cannot be taken steps 420, 430 and 440 are repeated, and if it can be taken, the system activates the image capturing apparatus to automatically take the picture 450. Then the system presents the final image to the user 460 and presents possible image corrections 470. The user needs to select the desired corrections 480 and the system implements them 490.

Figure 5:
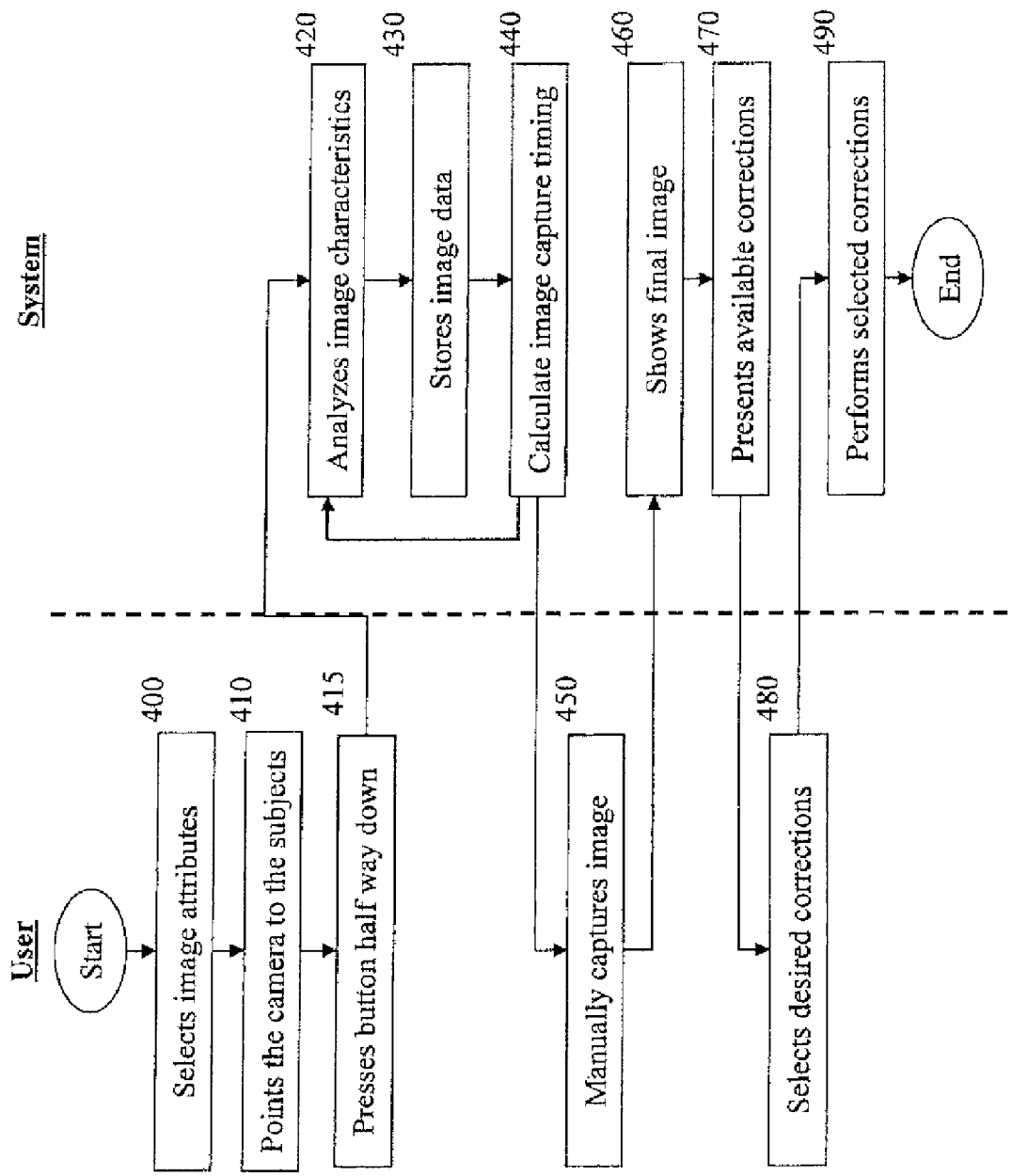
FIG. 5 is a flowchart illustrating the manual image capturing procedure according to an embodiment of the present invention.

Reference is now made to FIG. 5. The same steps of the procedure are repeated: the user selects image attributes 400, aims the camera at the subject 410, and activates the automatic timing mechanism by pressing the shutter release button half-way down 415. The system then continuously analyzes the image characteristics 420, collects image data for future use 430 and calculates the appropriate time for capturing the picture 440. Even though the system is in automatic timing mode, and steps 420 430 and 440 are repeated, the user can choose to manually take the picture 450 by pressing the shutter release button all the way down in a similar manner to taking pictures according to prior art. Once the picture is taken, the system presents the captured image to the user 460 and presents available corrections 470. The user may then select the corrections for implementation 480 and the system performs the selected corrections 490 to produce the processed image.

Figure 6:
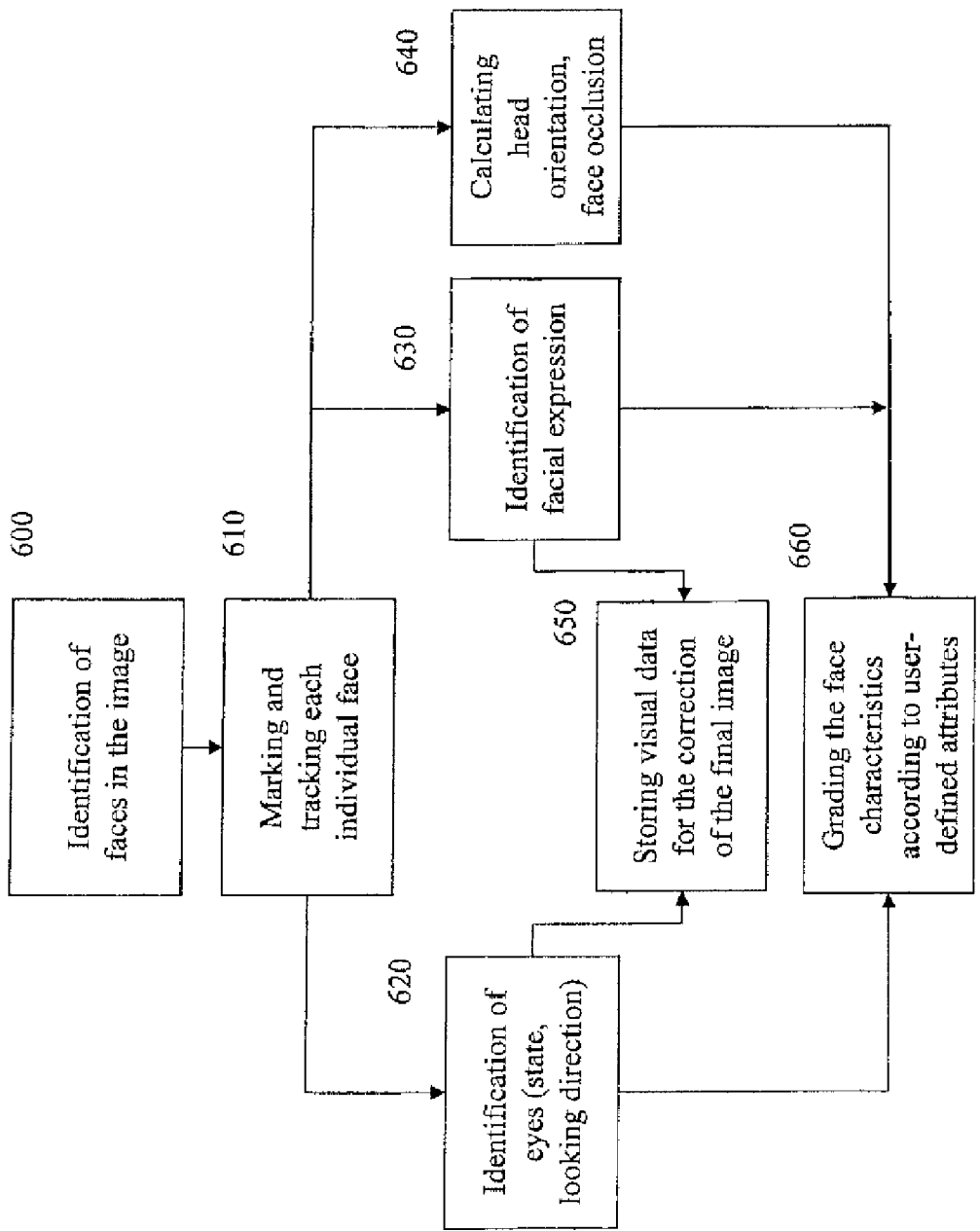
FIG. 6 is a block diagram illustrating the principle components of the procedures performing facial analysis in accordance with the present invention.

Reference is now made to FIG. 6. The first component of the image analyzing procedure identifies faces in the given image 600 (the image analysis can be applied to human or non human subjects). Provided that more then one face is identified a second procedure marks each face individually and continuously tracks their relative and absolute positions 610. The continuous tracking of the faces enables the system to attribute collected data to a particular subject. Having identified the faces the system can then analyze eyes state and looking direction 620, facial expressions 630, and head orientation and face occlusion 640 of each individual. The system performs these analyses according to facial analysis algorithms which are known to people who are skilled in the art. The system stores segments of visual data for use during the image correction stage 650. For instance, the system stores visual data of the eyes in an optimal condition, e.g. open and looking directly at the camera. Since the image is continuously analyzed the system updates the stored visual data of the eyes if a less then optimal state is saved at the initial stages.

Similarly, the system identifies the mouth and analyzes the facial expression determining the type of facial expression of the subjects and their intensity. The system stores visual data of facial expressions which are defined as desirable by the user. Based on the analysis of the state of the eyes, facial expression, head orientation angles and facial occlusion percentages, the system rates the level of suitability of each subject to the attributes defined by the user 660.

The system may also analyze the characteristics of the image and of the subjects in the image in relation to other attributes defined by the user such as the image motion and subject motion. The motion in the captured image, both of the total image and of the subjects, is calculated according to known motion detection algorithms such as comparing the position of objects in consecutive frames. Since the image is continuously analyzed, the system can identify patterns of motions in the image and of the subjects. The motion pattern recognition aids the system in predicting the optimal time for capturing the image.

Figure 7:
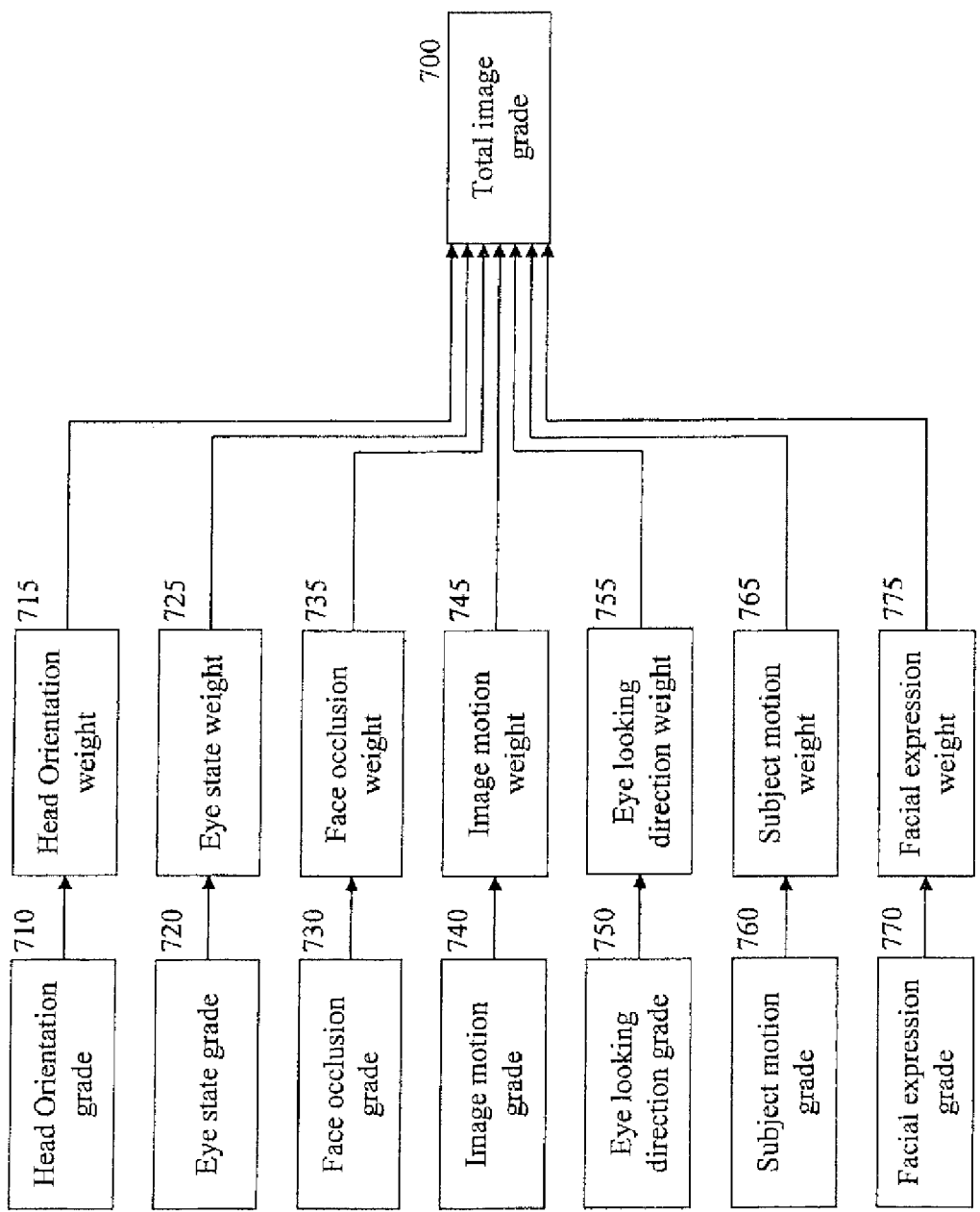
FIG. 7 is a schematic block diagram illustrating the components which make up the total image grade before the picture is taken.

Reference is now made to FIG. 7. The total image grade 700 may comprise of the calculated grade of each component 710, 720, 730, 740, 750, 760 and 770 by the system, according to the user-defined desired value of each component, multiplied by the relative weight of each component 715, 725, 735, 745, 755, 765 and 775. Thus, the contribution of the head orientation grade to the total image grade 700 is calculated according to the head orientation grade 710 as calculated by the system according to the desired value defined by the user, multiplied by its user-defined weight 715 and so on. The list of grades in FIG. 7 is an illustrative one and does not exhaust all possible factors which may be analyzed to produce the total image grade 700; additionally the total image grade 700 may be calculated using alternative calculation methods.

In order to perform the corrections of flash induced deformation in the final image the system checks whether the flash is about to be used when the picture is taken. If so, the system activates a procedure which captures an image a few fractions of a second before the flash is activated and the final image is captured. This first image is then used for correcting the flash induced deformations in the final image.

After the picture is taken, and the final image is stored in the memory of the camera, the final picture is scanned for anything which may need to be corrected.

Figure 8:
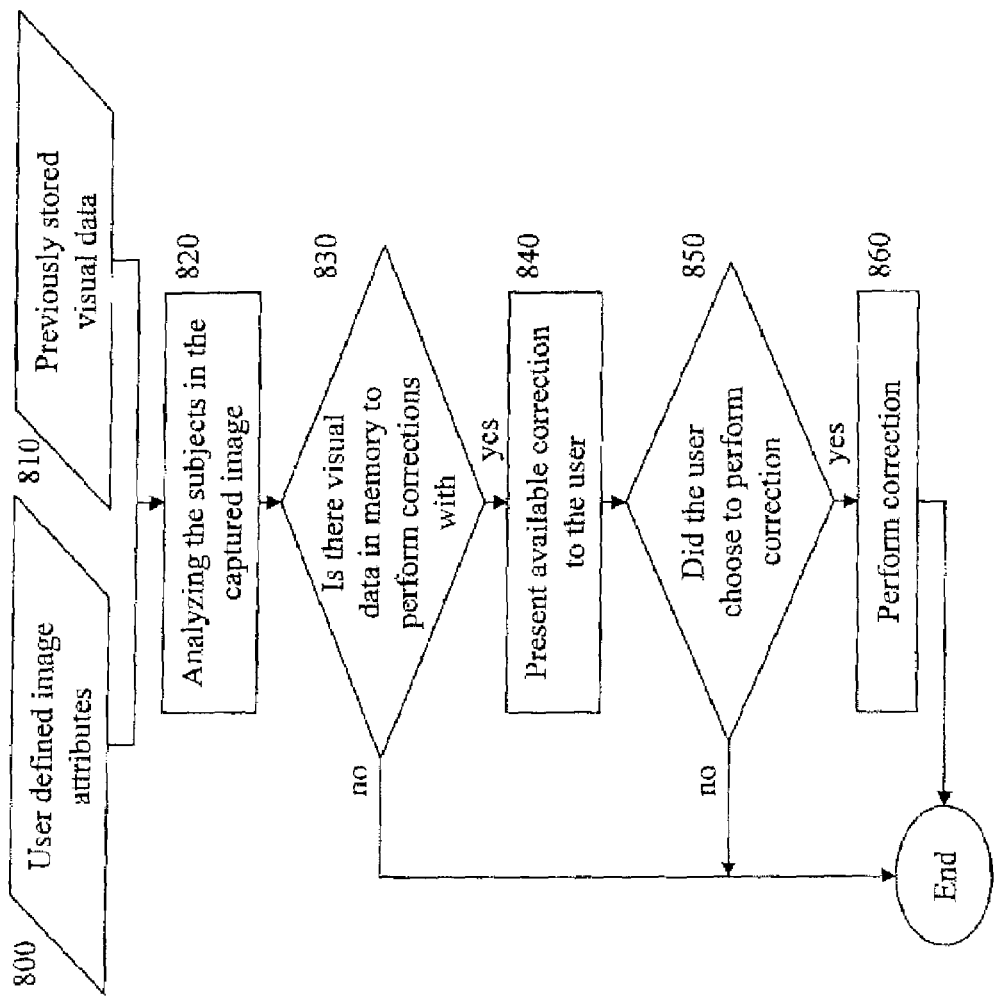
FIG. 8 is a flowchart illustrating the procedure of correcting the appearance of the subjects of the picture according to an embodiment of the present invention.

Reference is now made to FIG. 8. Based on the image attributes which were defined by the user as desirable 800, and on data stored before the picture was taken 810, the system measures the correlation of the captured image to the user-defined attributes 820, identifies specific problematic details it may correct 830 and offers a list of possible corrections to the user 840. The system analyses the faces of the subjects in the final image and checks for previously saved visual information of the particular subject which may aid in correcting the final image. If, for instance, in the final image the eyes of the subject are closed or not fully open, and the system finds that an image of the eyes of this subject in a fully open state were saved, the system offers the user to change the state of the eyes in the final image. Provided that the user chooses to perform this correction 850, the system analyzes the head orientation angle of the subject and adjusts the image of the eyes to suit it 860. A similar correction may be performed if the eyes of the subject are open but they are not looking directly at the camera and if the facial expression of the subjects is not the desired one. If the subjects are not looking directly at the camera, the system may move the image of the pupil of their eyes, taking into account their head orientation, so that they will seem as if they are looking directly at the camera. According to some embodiments of the invention, the system may also check for flash induced deformations in the final image.

Figure 9:
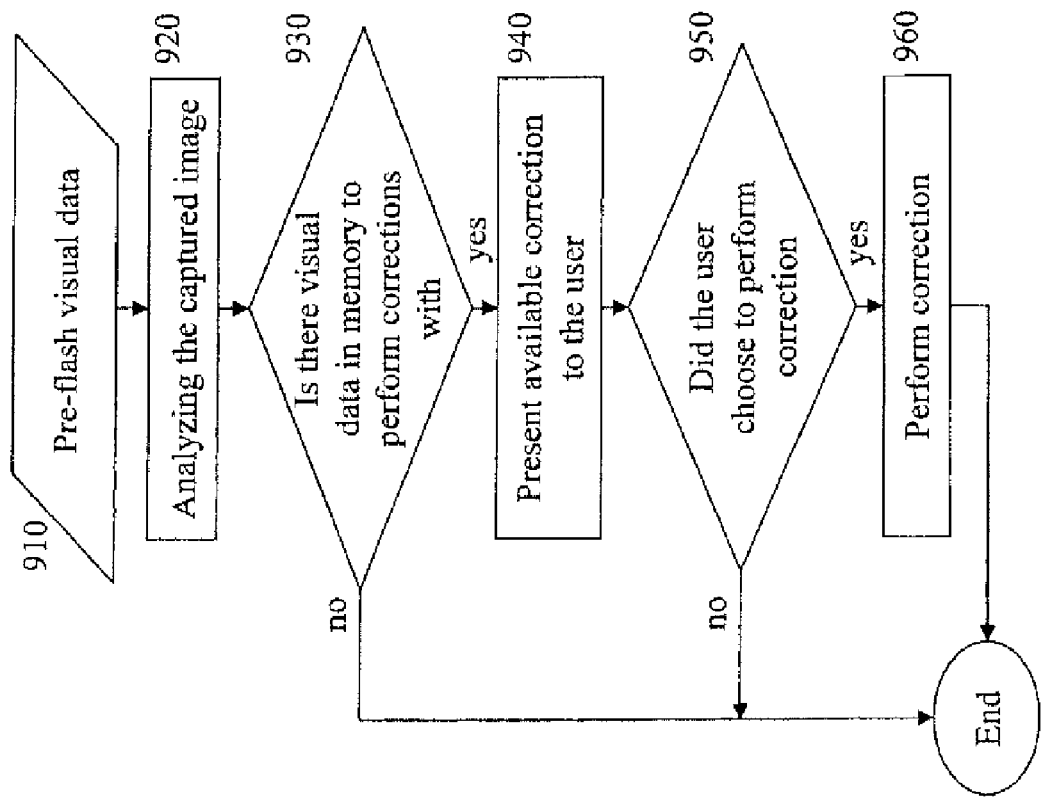
FIG. 9 is a flowchart illustrating the correction procedure of the flash induced deformations according to an embodiment of the present invention.

Reference is now made to FIG. 9. Based on the image captured before the flash was activated 910, the image is scanned for reflections 920. If any such deformations are found, the system verifies that a pre-flash image includes the necessary data to perform the image correction 930. Provided that these corrections may be performed the user is offered the option to activate the correction 950. Having received the conformation from the user the system performs the image the correction 960. Similarly, if the flash is activated the system may perform correction of red eyes in the final image. The system performs the correction of the color of the eyes according to the data about the eyes which was collected by the system before the image is taken.

In addition to the corrected image, the system may also save the original image and all visual data which was gathered by the system before the picture was taken, and a history log file documenting all corrections made to the original image during the image correction phase of the system. All this data is saved as a single logical entity, which can later be transferred to a different computer. This allows the user to perform the corrections at a later stage or alter the corrections made, on the same computer or on a different one which includes a designated software application. The user can then load the original image and use the collected data associated with it to further manipulate the image. The user can also load the corrected image, browse through the history file of the image, and undo specific changes, using a "before" and "after" simulations of the changes.

According to further embodiments of the present invention it is suggested to include a buffer memory for temporally saving captured images and a decision module for selecting between temporarily saved images by comparing between their calculated attributes values in relation to user defined attributes.

While the disclosed description relates to a still camera, additional embodiments of the present invention may also relate to a video camera. According to these embodiments, the video camera may start recording or stop recording according to particular criteria as they are define by the user. The operation of the activation of the camera is similar to the system as described above, yet instead of operating the image capturing mechanism of the camera, the system activates the record or the stop functions of the video camera according to the attributes as they are defined by the user.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A system for determining optimal timing for capturing an image of at least one face having facial sub object, upon fulfillment of predefined capturing requirements, the system comprising:
   an interface module; and
   a processing module,
   wherein the interface module obtains from a user, a plurality of capturing requirements,
   wherein the processing module repeatedly obtains over time, a sequence of images of the at least one face, from an imaging apparatus,
   wherein the capturing requirements comprise both static characteristics relating to facial expression and head orientation of the at least one face, and dynamic characteristics relating to changes in a position of the at least one face the facial sub objects thereof,
   wherein the processing module repeatedly compares the static characteristics relating to facial expression and head orientation of the at least one face in a particular obtained image with corresponding static characteristics relating to facial expression and head orientation of the at least one face in the capturing requirements, and instruct the imaging apparatus to instantly capture the particular image of the at least one face, if the comparing of the static characteristics detects fulfillment of the capturing requirements beyond a predefined threshold,
   wherein the processing module repeatedly compares, over time, the dynamic characteristics relating to changes in a position of the at least one face the facial sub objects thereof derived from the sequence of obtained images with corresponding dynamic characteristics relating to changes in a position of the at least one face and the facial sub objects thereof in the capturing requirements, and instruct the imaging apparatus to instantly capture an image of the at least one face if the comparing of the dynamic characteristics detects fulfillment of the capturing requirements beyond a predefined threshold,
   wherein the interface module is further arranged to allow the user to weight the static characteristics and the dynamic characteristics for a calculation of a total image grade, and
   wherein a particular percentage of a maximum total image grade is determined as a threshold indicator according to a default value.

2. The system of claim 1, wherein the processing module is further arranged to save visual data prior to the capturing process, wherein visual data definitions are based on the capturing requirements; and wherein the processing module is further arranged to manipulate the static characteristics and the dynamic characteristics such as to correct subject features according to user preferences based on recorded visual data.

3. The system of claim 2, wherein the visual data comprises at least two segments that are captured at different timing.

4. The system of claim 2, wherein the visual data further comprises at least one segment of a still image, taken a brief moment before a flash is activated.

5. The system of claim 2, wherein the obtained images and the visual data are saved as a single logical entity for use at a later date, on a computerized device.

6. The system of claim 2, wherein the processing module is further arranged to correct flash induced problems comprising reflections; red-eyes; false eye color; closed eyes; an absence of a smile; a non smiling face expression; flash-induced image deformations; and flash-induced brightness falsification.

7. The system of claim 2, wherein the processing module is further arranged to process the obtained images in respect to: color changes; brightness adjustment; image orientation; looking direction; head orientation; object geometry; image scaling; and image contrast.

8. The system of claim 1, wherein the imaging apparatus is a still digital camera.

9. The system of claim 8, wherein the still digital camera is housed in at least one of: a cellular phone, a PDA device, a personal computer.

10. The system of claim 1, wherein the interface module is further arranged to allow the user to define the dynamic characteristics.

11. The system of claim 1, wherein the threshold indicator presents a minimum match grade needed for the total image grade to exceed in order to activate the imaging apparatus.

12. The system of claim 11, wherein the interface module is further arranged to allow the user change a value of the threshold indicator.

13. The system of claim 11, wherein a value of the threshold indicator changes automatically according to predetermined criteria.

14. The system of claim 11, wherein the imaging apparatus is automatically activated when the value of the threshold is exceeded.

15. The system of claim 11, wherein the imaging apparatus is automatically activated when the total image grade exceeds the threshold value, and is maintained above the threshold value for a predetermined time span.

16. The system of claim 11, wherein the imaging apparatus is automatically activated when the total image grade exceeds the threshold value, and reaches a maximum value.

17. The system of claim 11, wherein the processing module is arranged to allow the user override the automatic activation of the imaging apparatus and activate the imaging apparatus manually.

18. The system of claim 1, wherein the processing module is arranged to save at least one template of image attributes relating to user preferences.

19. The system of claim 1, wherein the imaging apparatus is a video camera arranged to start recording and stop recording according to user defined criteria.

20. The system of claim 1, wherein the imaging apparatus is activated when user-defined single criterion is met.

21. The system of claim 1, further comprising:
a buffer memory for temporally saving the captured images; and
a decision module for selecting between temporarily saved images by comparing between their calculated attributes values in relation to user defined values.

22. The system of claim 1, wherein static characteristics comprise at least one of: a specific face; facial expression; and state of eyes.

23. The system of claim 1, wherein static characteristics comprise at least one of: head orientation angles; looking direction angles and facial occlusion percentages.

24. The system of claim 1, wherein static characteristics comprise at least one of: a minimum number of faces; and a specific event.

25. The system of claim 1, wherein the dynamic characteristics comprise at least one of: image motion speed; position of faces; and motion speed of the faces.

26. A method of determining optimal timing for capturing an image of at least one face having facial sub object upon fulfillment of predefined capturing requirements, the method comprising:
obtaining from a user, a plurality of capturing requirements, wherein the capturing requirements comprise both static characteristics and dynamic characteristics relating to facial expression and head orientation of the at least one face, and dynamic characteristics relating to changes in position of the at least one face and facial sub object thereof;
repeatedly obtaining over time, a sequence of images of the at least one face, from an imaging apparatus;
comparing the static characteristics relating to facial expression and head orientation of the at least one face and facial sub object thereof in a particular obtained image with corresponding static characteristics relating to facial expression and head orientation of the at least one face and facial sub object thereof in the capturing requirements, and instruct the imaging apparatus to instantly capture the particular image of the at least one face, if the comparing of the static characteristics detects fulfillment of the capturing requirements beyond a predefined threshold;
comparing, over time, the dynamic characteristics relating to changes in position of the at least one face and facial sub object thereof derived from the sequence of obtained images with corresponding dynamic characteristics relating to changes in position of the at least one face and facial sub object thereof in the capturing requirements, and instruct the imaging apparatus to instantly capture an image of the at least one face if the comparing of the dynamic characteristics detects fulfillment of the capturing requirements beyond a predefined threshold; and
weighing, via an interface module, the static characteristics and the dynamic characteristics for a calculation of a total image grade,
wherein a particular percentage of a maximum total image grade is determined as a threshold indicator according to a default value.

27. The method of claim 26, further comprising:
saving visual data prior to the obtaining of images, wherein the visual data definitions are based on the capturing requirements; and
manipulating captured images according to user preferences based on recorded visual data.

28. The method of claim 26, further comprising:
temporarily saving captured images; and
selecting between temporarily saved images by comparing between their calculated characteristics in relation to user defined capturing requirements.

29. A system for determining optimal timing for capturing an image of at least one face having facial sub object, upon fulfillment of predefined capturing requirements, the system comprising:
an interface module; and
a processing module,
wherein the interface module obtains from a user, a plurality of capturing requirements,
wherein the processing module repeatedly obtains over time, a sequence of images of the at least one face, from an imaging apparatus;
wherein the capturing requirements comprise both static characteristics relating to facial expression and head orientation of the at least one face, and dynamic characteristics relating to changes in a position of the at least one face the facial sub objects thereof,
wherein the processing module repeatedly compares the static characteristics relating to facial expression and head orientation of the at least one face in a particular obtained image with corresponding static characteristics relating to facial expression and head orientation of the at least one face in the capturing requirements, and instruct the imaging apparatus to instantly capture the particular image of the at least one face, if the comparing of the static characteristics detects fulfillment of the capturing requirements beyond a predefined threshold, wherein the interface module is further arranged to allow the user to weight the static characteristics and the dynamic characteristics for a calculation of a total image grade, wherein the processing module repeatedly compares, over time, the dynamic characteristics relating to changes in a position of the at least one face the facial sub objects thereof derived from the sequence of obtained images with corresponding dynamic characteristics relating to changes in a position of the at least one face and the facial sub objects thereof in the capturing requirements, and instruct the imaging apparatus to instantly capture an image of the at least one face if the comparing of the dynamic characteristics detects fulfillment of the capturing requirements beyond a predefined threshold, wherein the static characteristics comprise: a specific face; a facial expression; a state of eyes; head orientation angles; looking direction angles; facial occlusion percentages; a minimum number of faces; and a specific event, and the dynamic characteristics comprise: an image motion speed; a position of faces; and a motion speed of the faces, and wherein a particular percentage of a maximum total image grade is determined as a threshold indicator according to a default value.

* * * * *